United States Patent

Ueno et al.

[11] Patent Number: 5,939,163
[45] Date of Patent: Aug. 17, 1999

[54] OPTICAL INFORMATION RECORDING MEDIUM

[75] Inventors: Yasunobu Ueno; Tsutomu Satou; Tatsuya Tomura; Noboru Sasa; Yasuhiro Hgashi, all of Yokohama, Japan

[73] Assignee: Ricoh Co., Ltd., Tokyo, Japan

[21] Appl. No.: 08/880,405

[22] Filed: Jun. 23, 1997

[30] Foreign Application Priority Data

Jun. 21, 1996 [JP] Japan ................................. 8-181603

[51] Int. Cl.⁶ .................................................. B32B 3/00
[52] U.S. Cl. ...................... 428/64.1; 428/64.2; 428/64.4; 428/64.8; 428/913; 430/270.14; 430/270.16; 430/495.1; 430/945; 369/283; 369/288
[58] Field of Search ..................... 428/64.1, 64.2, 428/64.4, 64.7, 64.8, 457, 913; 430/270.14, 270.15, 270.16, 270.17, 270.19, 495.1, 945; 369/283, 288

[56] References Cited

U.S. PATENT DOCUMENTS

| | | |
|---|---|---|
| 4,626,496 | 12/1986 | Sato . |
| 4,656,121 | 4/1987 | Sato et al. . |
| 4,714,667 | 12/1987 | Sato et al. . |
| 4,735,839 | 4/1988 | Sato et al. . |
| 4,737,444 | 4/1988 | Satoh et al. . |
| 4,758,499 | 7/1988 | Abe et al. . |
| 4,767,693 | 8/1988 | Oba et al. . |
| 4,891,305 | 1/1990 | Oba et al. . |
| 5,002,812 | 3/1991 | Umehara et al. . |
| 5,028,467 | 7/1991 | Maruyama et al. . |
| 5,085,909 | 2/1992 | Satoh et al. . |
| 5,149,819 | 9/1992 | Satoh et al. . |
| 5,256,794 | 10/1993 | Satoh et al. . |
| 5,260,165 | 11/1993 | Satou et al. . |
| 5,298,608 | 3/1994 | Murayama et al. .............. 534/693 |
| 5,389,419 | 2/1995 | Maeda et al. ..................... 428/64.1 |
| 5,447,823 | 9/1995 | Ochiai et al. ..................... 430/270.1 |
| 5,510,229 | 4/1996 | Satoh et al. . |

FOREIGN PATENT DOCUMENTS 0755052  1/1997  European Pat. Off. .

*Primary Examiner*—Elizabeth Evans
*Attorney, Agent, or Firm*—Oblon, Spivak, McClelland, Maier & Neustadt, P.C

[57] ABSTRACT

An optical information recording medium which records at shorter laser wavelengths and has excellent light resistance and archival stability includes a supporting substrate and a recording layer coated on the substrate. The recording layer includes a metal chelated azo compound, the azo compound having the general formula (I):

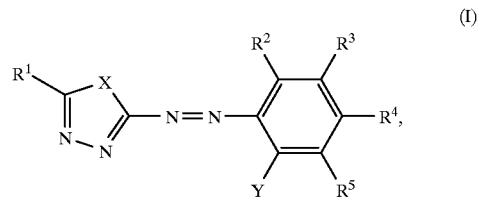

wherein X is $NR^6$ group, oxygen or sulphur, wherein $R^6$ is hydrogen or alkyl; Y is hydroxy, carboxy, or carbamoyl; each of $R^1$–$R^5$ is independently hydrogen, substituted or unsubstituted alkyl, substituted or unsubstituted aryl, substituted or unsubstituted alkenyl, alkoxy, amino, halogen, nitro, cyano, trifluoromethyl, or carboxy, with the proviso that all of $R^1$–$R^5$ are not simultaneously hydrogen; and the metal is a metal ion of Groups 3–12 of the Periodic Table.

18 Claims, 2 Drawing Sheets

OPTICAL INFORMATION RECORDING MEDIUM

BACKGROUND OF THE INVENTION

1. Field of the Invention

The present invention relates to an optical information recording medium and a method for recording optical information.

2. Description of the Related Art

Optical recording media have recently come into wide use as a viable means for the storage and/or archiving of large volumes of information. In these systems, the optical recording materials undergo a localized change in optical properties such as absorption maxima or extinction coefficients when exposed to radiation of high energy density such as laser light. The localized change can be utilized for recording information.

A variety of optical recording materials have been developed. A conventional 'write-once' blank disk (CD-WORM or CD-R) is coated with a dye, as a recording material, and solid state lasers are conventionally used to record as well as read the information. Since the lasers generally have emission wavelengths of about 770–790 nanometers, conventional recording media typically operate in these laser wavelengths.

In optical recording media, the trend is toward higher information density to accommodate a greater volume of stored information. Accordingly, it is conceivable for laser light to have shorter wavelengths to meet the requirements of recording and reading out the higher volume of information data. Currently, no optical recording materials adequately fulfill the requirements.

Various recording materials for CD-R recording media have been disclosed, for example, cyanine dye materials and phthalocyanine dye materials.

Disclosures on the cyanine dye materials, for example, are found in Japanese Laid-Open Patent Applications Nos. 57-82093, 58-56892, 58-112790, 58-114989, 59-85791, 60-83236, 60-89842, and 61-25886. Disclosures on the phthalocyanine dye materials are found in Japanese Laid-Open Patent Applications Nos. 61-150243, 61-177287, 61-154888, 61-246091, 62-39286, 63-37791, and 63-39888.

The above-disclosed dye materials, however, do not possess satisfactory light resistance or archival stability, and are not capable of recording and reading out with laser light having wavelengths shorter than 700 nanometers. Therefore, there remains a need for improved optical recording materials that are capable of recording and reading out with shorter wavelength laser light, and have adequate light resistance and stability characteristics.

Conventional disk apparatus for CD-R media recording and readout use lasers with wavelengths ranging from about 770 to 790 nanometers. To meet the requirements of recording and reading out higher volumes of information data, laser beams having shorter wavelengths will inevitably be required for CD-R systems.

In this context, it is noteworthy to add that conventional CD's and CD-ROM's (read-only-memory CD's) record information as pits on the surface of a substrate, and an aluminum reflecting coating is provided over the substrate and the pits. Since the aluminum layer has relatively few reflectivity changes with light wavelength, readout of recorded data appears feasible at the above-mentioned shorter laser wavelengths of future systems, as well as at wavelengths of conventional systems that are presently available. However, in contrast to the above-described aluminum layer, the recording media of CD-R may be considerably affected by the shorter wavelengths. Conventional CD-R media employ recording materials such as dye compounds that have their maximum absorption at wavelengths ranging from about 680 to 750 nanometers, and are designed to optimize parameters such as optical constants and layer thickness of constituent layers to exhibit high reflectivities at wavelengths of about 770 to 790 nanometers.

Accordingly, lower reflectivities of conventional recording media are typically observed at wavelengths shorter than 700 nanometers, which may give rise to shortcomings in future CD-R systems. As a result, information that is otherwise successfully recorded and read by the current CD-R systems, may be inadequately read by future CD-R systems.

Various CD-R media have been developed that include recording layers having a cyanine dye/metal reflecting layer construction (disclosed in, for example, Japanese Laid-Open Patent Applications Nos. 1-159842, 2-42652, 2-13656, and 2-168446), phthalocyanine dye/metal reflecting layer (Japanese Laid-Open Patent Applications Nos. 1-176585, 3-215466, 4-113886, 4-226390, 5-1272, 5-171052, 5-116456, 5-69860, and 5-139044), or a metal chelated azo compound/metal reflecting layer construction (Japanese Laid-Open Patent Applications Nos. 4-46186, 4-141489, 4-361088, and 5-279580). However, in the recording media fabricated from these dye materials, the optical characteristics are not satisfying at wavelengths shorter than 700 nanometers.

It is therefore very desirable to provide materials for recording media which satisfy the above-mentioned requirements.

SUMMARY OF THE INVENTION

One object of the present invention to provide an optical recording medium which overcomes the above-noted difficulties.

Another object of the present invention is to provide an optical recording medium that is effective for high density recording of optical information at shorter laser wavelengths, and has excellent light resistance and storage stability.

Another object of the present invention is to provide an optical recording media that is readable by the next generation of optical disk systems, and can also be recorded and read with conventional CD-R systems.

Another object of the present invention is to provide an optical recording medium capable of being both recorded and read out by high-density optical disk systems of the next generation.

Another object of the present invention is to provide a method for reading optical information at laser wavelengths of less than 700 nanometers.

Another object of the present invention is to provide a method for recording optical information at laser wavelengths of less than 700 nanometers.

These and other objects of the invention have been achieved by providing an optical recording medium which contains a metal chelated azo compound in the recording layer.

One embodiment of the present invention is an optical information recording medium, including:

a supporting substrate; and a recording layer coated on said substrate; wherein said recording layer contains a metal chelated azo compound, the azo compound having the general formula (I):

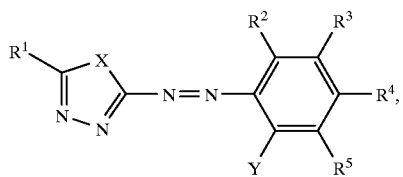

(I)

wherein X is $NR^6$ group, oxygen or sulfur, wherein $R^6$ is hydrogen or alkyl;

Y is hydroxy, carboxy or carbamoyl;

each of $R^1$–$R^5$ is independently hydrogen, substituted or unsubstituted alkyl, substituted or unsubstituted aryl, substituted or unsubstituted alkenyl, alkoxy, amino, halogen, nitro, cyano, trifluoromethyl, or carboxy, with the proviso that all of $R^1$–$R^5$ are not simultaneously hydrogen;

and the metal is a metal ion of Groups 3 through 12 of the Periodic Table.

Another embodiment of the present invention is a method of recording optical information, which includes:

irradiating with radiation having a wavelength between 630–720 nanometers, an optical information recording medium, which contains:
a supporting substrate; and
a recording layer coated on said substrate; wherein
said recording layer contains a metal chelated azo compound, the azo compound having the general formula (I):

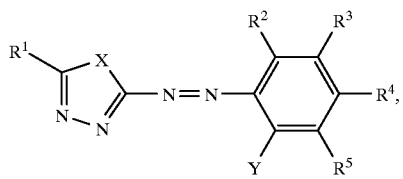

(I)

wherein X is $NR^6$ group, oxygen or sulfur, wherein $R^6$ is hydrogen or alkyl;

Y is hydroxy, carboxy or carbamoyl;

each of $R^1$–$R^5$ is independently hydrogen, substituted or unsubstituted alkyl, substituted or unsubstituted aryl, substituted or unsubstituted alkenyl, alkoxy, amino, halogen, nitro, cyano, trifluoromethyl, or carboxy, with the proviso that all of $R^1$–$R^5$ are not simultaneously hydrogen;

and the metal is a metal ion of Groups 3 through 12 of the Periodic Table.

Another embodiment of the present invention is a method of recording optical information, which includes:

irradiating with radiation having a wavelength between 600–780 nanometers, an optical information recording medium, which contains:
a supporting substrate;
a recording layer coated on said substrate; wherein
said recording layer contains a metal chelated azo compound, the azo compound having the general formula (I):

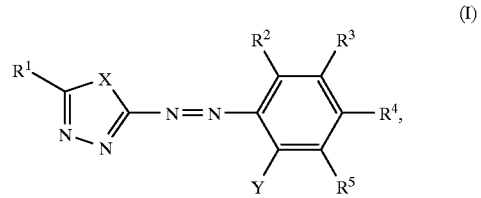

(I)

wherein X is $NR^6$ group, oxygen or sulfur, wherein $R^6$ is hydrogen or alkyl;

Y is hydroxy, carboxy or carbamoyl;

each of $R^1$–$R^5$ is independently hydrogen, substituted or unsubstituted alkyl, substituted or unsubstituted aryl, substituted or unsubstituted alkenyl, alkoxy, amino, halogen, nitro, cyano, trifluoromethyl, or carboxy, with the proviso that all of $R^1$–$R^5$ are not simultaneously hydrogen;

and the metal is a metal ion of Groups 3 through 12 of the Periodic Table; and an organic compound having a light absorption maximum between 680–750 nanometers.

The metal chelated azo compounds and optical recording medium of the present invention are capable of being recorded and read out by high-density optical disk systems using a semiconductor laser having wavelengths shorter than 700 nanometers, with excellent light resistance and storage stability. Furthermore, by including an organic dye compound which has a maximum absorption wavelength between 680 and 750 nanometers in the recording layer, it is feasible for the recording medium to be read out by disk systems of the next generation, as well as by the present disk systems.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1A:
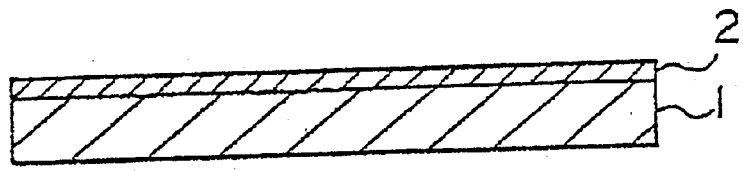
FIGS. 1a through 1d are cross sections of an optical recording medium in accordance with one embodiment of the present invention.

Other features of the invention will become apparent in the course of the following descriptions of exemplary embodiments which are given for illustration and are not intended to be limiting thereof.

The metal chelated azo compound of the present invention is preferably prepared from azo compounds and metal salts, wherein the azo compounds are represented by the formula (I)

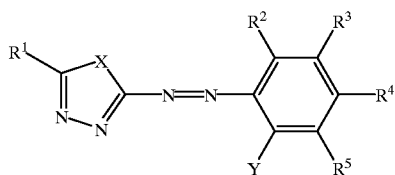

wherein, X is $NR^6$ group, oxygen or sulfur, in which $R^6$ is hydrogen or alkyl; Y is hydroxy, carboxy or carbamoyl; each of $R^1$ through $R^5$, independently, is hydrogen, substituted or unsubstituted alkyl, substituted or unsubstituted aryl, substituted or unsubstituted alkenyl, alkoxy, amino, halogen, nitro, cyano, trifluoromethyl or carboxy, in which all of $R^1$ through $R^5$ are not hydrogen, simultaneously; and the metal salt is represented by the formula MZ, wherein M is a metal ion of Groups 3 through 12 of the Periodic Table, a metal dioxide thereof, or a metal halide thereof; and Z is an anion.

Preferred examples of M in the above-mentioned metal salt MZ includes metals such as Sc and Y of group 3; Ti, Zr, and Hf of group 4; V, Nb, and Ta group 5; Cr, Mo, and W of group 6; Mn, Tc, and Re of group 7; Fe, Ru, and Os of group 8; Co, Rh, and Ir of group 9; Ni, Pd, and Pt of group 10; Cu, Ag, and Au of group 11; Zn, Cd, and Hg of group 12; oxides thereof, and halides thereof such as fluorides, chlorides, bromides, and iodides.

Preferred examples of Z of the above-mentioned MZ include anions as shown in Table I below.

methylpropyl, 1-methylheptyl, 1-ethylhexyl, 1-propylpentyl, 1-isopropylpentyl, 1-isopropyl-2-methylbutyl, 1-isopropyl-3-methylbutyl, 1-methyloctyl, 1-ethylheptyl, 1-propylhexyl, 1-isobutyl-3-methylbutyl and the like; tertiary alkyl groups such as neopentyl, tert-butyl, tert-hexyl, tert-amyl, tert-octyl and the like; and cycloalkyl groups such as cyclohexyl, 4-methylcyclohexyl, 4-ethylcyclohexyl, 4-tert-butylcyclohexyl, 4-(2-ethylhexyl) cyclohexyl, bornyl, isobornyl, adamantanyl and the like.

The above-mentioned primary and secondary alkyl groups may each be preferably substituted by hydroxyl, halogen, and alkyl groups that may be interrupted by oxygen, sulfur, nitrogen, or other atoms.

Preferred examples of the above-mentioned alkyl groups that are interrupted by oxygen include methoxymethyl, methoxyethyl, ethoxymethyl, ethoxyethyl, butoxyethyl, ethoxyethoxyethyl, phenoxyethyl, methoxypropyl, and ethoxypropyl. Preferred examples of the alkyl groups that are interrupted by sulfur include methylthioethyl, ethylthioethyl, ethylthiopropyl, and phenylthioethyl. Preferred examples of the alkyl groups that are interrupted by nitrogen include dimethylaminoethyl, diethylaminoethyl, and diethylaminopropyl.

Preferred examples of aryl groups $R^1$ through $R^5$ useful for the present invention include phenyl, ethylphenyl, butylphenyl, nonylphenyl, naphthyl, butylnaphthyl, and nonylnaphthyl. Preferably, the aryl groups may each be substituted by hydroxyl, halogen, or the like, and may also be substituted by aryl groups that are interrupted by oxygen, sulfur, nitrogen, or other atoms.

Preferred examples of the above-mentioned aryl groups that are interrupted by oxygen include phenoxyethyl,

TABLE 1

| $I^-$ | $Br^-$ | $Cl^-$ | $F^-$ | $ClO_4^-$ | $PF_6^-$ | $SbF_6^-$ | $BF_4^-$ | $SCN^-$ |
|---|---|---|---|---|---|---|---|---|
| $CH_3COO^-$ | | | $TiF_6^-$ | $CN^-$ | $NO_3^-$ | $NO_2^-$ | $SiF_6^{2-}$ | $ZrF_6^{2-}$ |
| $SO_4^{2-}$ | $SO_3^{2-}$ | $S_2O_3^{2-}$ | | | 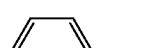 |  | | |
| 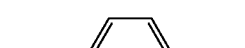 | | $PO_4^{3-}$ | | | | | | |

Preferred alkyl groups suitable for $R^1$ through $R^6$ in formula (I) include primary alkyl groups such as methyl, ethyl, n-propyl, n-butyl, n-pentyl, n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nanodecyl, n-eicosyl, and the like; secondary alkyl groups such as isobutyl, isoamyl, 2-methylbutyl, 2-methylpentyl, 3-methylpentyl, 4-methylpentyl, 2-ethylbutyl, 2-methylhexyl, 3-methylhexyl, 4-methylhexyl, 5-methylhexyl, 2-ethylpentyl, 3-ethylpentyl, 2-methylheptyl, 3-methylheptyl, 4-methylheptyl, 5-methylheptyl, 2-ethylhexyl, 3-ethylhexyl, isopropyl, sec-butyl, 1-ethylpropyl, 1-methylbutyl, 2-dimethylpropyl, 1-methylheptyl, 1-ethylbutyl, 1,3-dimethylbutyl, 1,2-dimethylbutyl, 1-ethyl-2-methylpropyl, 1-methylhexyl, 1-ethylheptyl, 1-propylbutyl, 1-isopropyl-2-methylpropyl, 1-ethyl-2-methylbutyl, 1-ethyl-2-methylbutyl, 1-propyl-2- methoxyphenyl, and butoxyphenyl. Preferred examples of the aryl groups that are interrupted by sulfur include phenylthioethyl, methylthioethyl, and butylthioethyl. Preferred examples of the aryl groups that are interrupted by nitrogen include dimethylaminophenyl and dibutylaminophenyl.

The present invention may be recorded and read out with radiation having a wavelength of 600–780 nanometers, preferably 600–750 nanometers, more preferably 630–720 nanometers, and most preferably 680–720 nanometers. These ranges include all specific values and subranges therebetween, for example, 680–750 nanometers, 635–780 nanometers, and 600–700 nanometers.

Preferred examples of alkenyl groups $R^1$ through $R^5$ include ethenyl, propenyl, butenyl, hexenyl, octenyl, dodecenyl, cyclohexenyl, and butylhexenyl. Preferably, the alkenyl groups may each be substituted by hydroxyl, halogen, or the like.

In the azo compounds represented by formula (I), if substituents $R^1$ through $R^5$ are simultaneously hydrogen, the resultant metal chelated azo compounds will generally exhibit light absorption bands in a region of relatively short wavelength. Therefore, these compounds are not preferable for recording by laser beams having wavelengths ranging from about 600 to 750 nanometers.

Preferably, electron donating groups such as alkyl, amino, and alkoxy groups are introduced into the $R^2$ and the $R^4$ positions of formula (I), and the absorption bands of the resulting metal chelated azo compounds shift to a longer wavelength region. As a result, the chelate compounds are preferred for recording at wavelengths ranging from about 600 to 750 nanometers.

More preferably, $R^4$ is an amino group represented by $NR^7R^8$, wherein each of $R^7$ and $R^8$ is independently hydrogen, alkyl, or aryl.

Preferred examples of the alkyl group and the aryl group for $R^7$ and $R^8$ are those already described for $R^1$ through $R^5$.

Preferred examples of metal chelated azo compounds prepared from an azo dye compound represented by formula (I) and a metallic salt represented by MZ are given in Table 2.

TABLE 2

| Cpd No. | X | Y | $R^1$ | $R^2 \sim R^5$ | MZ |
|---|---|---|---|---|---|
| 1 | S | COOH | H | $R^4 = N(C_2H_5)_2$ | $NiCl_2$ |
| 2 | NH | COOH | H | $R^4 = N(C_4H_9)_2$ | $Ni(ClO_4)_2$ |
| 3 | $NCH_3$ | COOH | H | $R^4 = N(CH_3)_2$ | $NiSO_4$ |
| 4 | O | COOH | Br | $R^4 = N(C_4H_9)_2$ | $Ni(OCOCH_3)_2$ |
| 5 | $NC_4H_9$ | COOH | H | $R^4 = NH_2$ | $Ni(CN)_2$ |
| 6 | S | OH | Br | $R^4 = OH$ | $Ni(PF_6)_2$ |
| 7 | NH | OH | I | $R^4 = N(C_2H_5)_2$ | $Ni(BF_4)_2$ |
| 8 | $NCH_3$ | OH | H | $R^4 = N(Ph)_2$ | $Ni(SCH)_2$ |
| 9 | O | OH | H | $R^4 = N(CH_3)(C_3H_7)$ | $NiBr_2$ |
| 10 | $NC_4H_9$ | OH | Br | $R^4 = NH(CH_3)$ | $NiI_2$ |
| 11 | S | $CONH_2$ | $CH_3$ | $R^4 = OH$ | $FeCl_3$ |
| 12 | NH | $CONH_2$ | $CH_3$ | $R^4 = N(Ph)_2$ | $Fe(SO_4)_3$ |
| 13 | $NCH_3$ | $CONH_2$ | $CH_3$ | $R^3 = OC_4H_9, R^4 = N(CH_3)_2$ | $Fe(ClO_4)_2$ |
| 14 | O | $CONH_2$ | $C_2H_5$ | $R^3 = OCH_3, R^4 = N(C_2H_5)_2$ | $FeBr_3$ |
| 15 | $NC_4H_9$ | $CONH_2$ | $C_2H_5$ | $R^4 = N(C_4H_9)_2$ | $Fe(SCN)_3$ |
| 16 | S | COOH | $C_4H_9$ | $R^4 = N(CH_3)_2$ | $ZnCl_2$ |
| 17 | NH | COOH | $C_4H_9$ | $R^4 = N(CH_3)_2$ | $ZnCl_2$ |
| 18 | $NCH_3$ | COOH | $CH_3$ | $R^4 = N(CH_3)_2$ | $CoCl_2$ |
| 19 | O | COOH | H | $R^4 = N(CH_3)_2$ | $Co(ClO_4)_2$ |
| 20 | $NC_4H_9$ | COOH | H | $R^3 = OC_4H_9, R^4 = N(CH_3)_2$ | $CoSO_4$ |
| 21 | S | OH | $CH_3$ | $R^3 = OC_4H_9, R^4 = N(CH_3)_2$ | $ZnCl_2$ |
| 22 | NH | OH | $CH_3$ | $R^3 = OC_4H_9, R^4 = N(CH_3)_2$ | $ZnCl_2$ |
| 23 | $NCH_3$ | OH | H | $R^4 = N(Ph)_2$ | $ZnCl_2$ |
| 24 | O | OH | H | $R^4 = N(Ph)_2$ | $CuCl_2$ |
| 25 | $NC_4H_9$ | OH | H | $R^4 = N(Ph)_2$ | $Cu(ClO_4)_2$ |
| 26 | S | COOH | Br | $R^2 = OCH_3, R^4 = NH(C_4H_9)$ | $CuSO_4$ |
| 27 | NH | COOH | Br | $R^2 = OCH_3, R^4 = N(CH_3)(C_2H_5)$ | $Cu(OCOCH_3)_2$ |
| 28 | $NC_4H_9$ | COOH | Br | $R^2 = OC_2H_5, R^4 = NH_2$ | $Cu(CN)_2$ |
| 29 | O | COOH | Br | $R^2 = OCH_3, R^4 = N(C_4H_9)_2$ | $Cu(PF_6)_2$ |
| 30 | $NC_4H_9$ | COOH | Br | $R^2 = OCH_3, R^4 = NH_2$ | $Cu(SCN)_2$ |
| 31 | S | OH | H | $R^3 = OCH_3, R^4 = NH(C_4H_9)$ | $Mn(NO_3)_2$ |
| 32 | NH | OH | H | $R^3 = OCH_3, R^4 = N(CH_3)(C_2H_5)$ | $VCl_3$ |
| 33 | $NCH_3$ | OH | H | $R^3 = OC_2H_5, R^4 = NH_2$ | $MoCl_5$ |
| 34 | O | OH | H | $R^3 = OCH_3, R^4 = N(C_4H_9)_2$ | $PbSO_4$ |
| 35 | $NC_4H_9$ | OH | H | $R^3 = OCH_3, R^4 = NH_2$ | $Rh(OCOCH_3)_2$ |
| 36 | S | COOH | $NO_2$ | $R^4 = N(C_4H_9)_2$ | $AgNO_3$ |
| 37 | NH | COOH | CN | $R^4 = N(C_4H_9)_2$ | $Cr_2(SO_4)_2$ |
| 38 | $NCH_3$ | COOH | H | $R^4 = NH(C_8H_{17})$ | $YF_3$ |
| 39 | O | COOH | H | $R^2 = OCH_3, R^4 = NH_2$ | $Ru(OCOCH_3)_3$ |
| 40 | $NC_4H_9$ | COOH | H | $R^2 = OCH_3, R^4 = NH_2$ | $TiI_4$ |
| 41 | S | OH | Cl | $R^2 = OCH_3, R^4 = NH(C_4H_9)$ | $Cu(OCOCH_3)_2$ |
| 42 | NH | OH | Cl | $R^2 = OCH_3, R^4 = N(CH_3)(C_2H_5)$ | $Ni(OCOCH_3)_2$ |
| 43 | $NCH_3$ | OH | Cl | $R^2 = OC_2H_5, R^4 = NH_2$ | $Co(ClO_4)_2$ |
| 44 | $NC_2H_5$ | OH | Cl | $R^2 = OCH_3, R^4 = N(C_4H_9)_2$ | $Fe(SCH)_3$ |
| 45 | $NC_4H_9$ | OH | Cl | $R^2 = OCH_3, R^4 = NH_2$ | $ZnCl_2$ |
| 46 | S | $CONH_2$ | $F(CH_3)_3$ | $R^4 = NH_2$ | $NiSO_4$ |
| 47 | NH | $CONH_2$ | $N(CH_3)_2$ | $R^4 = N(CH_3)_2$ | $Rh(OCOCH_3)_2$ |
| 48 | $NCH_3$ | $CONH_2$ | $F(CH_3)_3$ | $R^4 = NH_2$ | $Ru(OCOCH_3)_3$ |
| 49 | $NC_2H_5$ | $CONH_2$ | $N(CH_3)_2$ | $R^4 = N(CH_3)_2$ | $Cu(ClO_4)_2$ |
| 50 | $NC_4H_9$ | $CONH_2$ | H | $R^3 = OC_4H_9, R^4 = N(CH_3)_2$ | $NiSO_4$ |

Note: $R^2$ through $R^5$ are all hydrogen unless specified otherwise and

Ph = 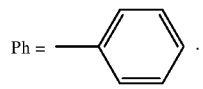 .

Preferably, the recording layer of the present invention may further comprise an organic compound, which is incorporated into the recording layer together with the metal chelated azo compounds, and with exhibits an absorption maximum at wavelengths ranging from about 680 to 750 nanometers.

Preferred examples of such organic compounds include cyanine dye compounds (more preferably cyanine dyes of pentamethine), phthalocyanine dye compounds, diarylmethane dyes, and triarylmethane dyes.

Preferred cyanine dye compounds suitable for the present invention are represented by the following formula (II):

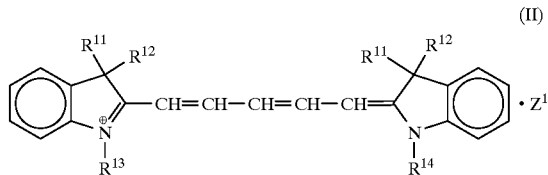

(II)

wherein $R^{11}$ and $R^{12}$ are each independently an alkyl group having 1 to 3 carbon atoms; $R^{13}$ and $R^{14}$ are each independently a substituted or unsubstituted alkyl group having 1 to 6 carbon atoms; and $Z^1$ is an acid anion, Preferably, the aromatic ring may be fused with another aromatic ring and may be preferably substituted by alkyl, halogen, alkoxy, or acyl.

Preferably, the phthalocyanine dye compounds suitable for the present invention have the following formulae (III-1) and (III-2):

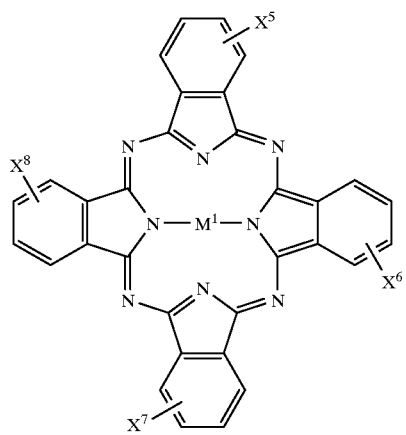

(III-1)

wherein $M^1$ is Ni, Pd, Cu. Zn, Co, Mn, Fe, TiO, or VO; each of $X^5$ through $X^8$, independently, is —OR or —SR at the substitution position of α;and R is a substituted or unsubstituted straight, branched, or alicyclic alkyl group having 3 to 12 carbon atoms or a substituted or unsubstituted aryl group. Preferably, substituents of the benzene ring other than $X^5$ through $X^8$ are each hydrogen or halogen.

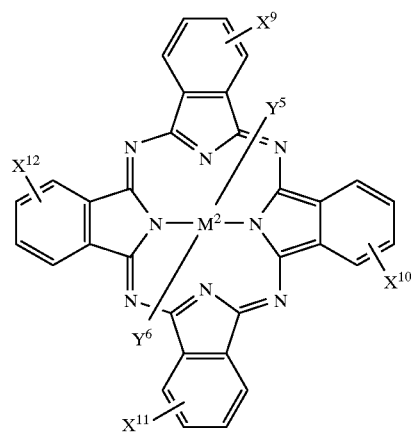

(III-2)

wherein $M^2$ is Si, Ge, In, or Sn; each of $X^9$ through $X^{12}$, independently, is —OR or —SR at the substitution position of α; R is a substituted or unsubstituted straight, branched, or alicyclic alkyl group having 3 to 12 carbon atoms or a substituted or unsubstituted aryl group; each of $Y^5$ and $Y^6$, independently, is —OSiR$^{15}$R$^{16}$R$^{17}$, —OCOR$^{15}$R$^{16}$R$^{17}$, or —OPOR$^{15}$R$^{16}$R$^{17}$; and each of $R^{15}$ through $R^{17}$, independently, is an alkyl or aryl group having 1 to 10 carbon atoms. Preferably, substituents of the benzene ring other than $X^9$ through $X^{12}$ are each hydrogen or halogen.

Preferably, triarylmethane compounds suitable for the present invention are represented by the following formula (IV):

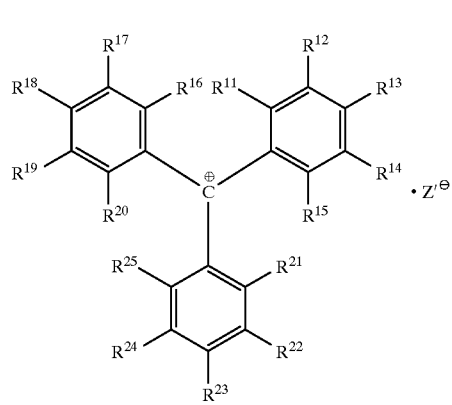

(IV)

wherein each of $R^{13}$ and $R^{18}$, independently, is hydrogen, substituted or unsubstituted alkoxy, or a substituted or unsubstituted amino; each of $R^{11}$, $R^{12}$, $R^{14}$, $R^{15}$, $R^{16}$, $R^{17}$, $R^{19}$, and $R^{20}$, independently, is hydrogen or halogen; each of $R^{21}$ through $R^{25}$, independently, is hydrogen, halogen, hydroxy, substituted or unsubstituted alkoxy, substituted or unsubstituted amino, carboxyl, or sulfo; and Z' is an anion. Preferably the triarylmethane compounds of formula (IV) are incorporated alone or in combination.

Preferably, the recording layer of the present invention includes at least one metal chelated azo compound having formula (I), and, optionally, one or more of the organic compounds (II) through (IV) alone or in combination.

When at least one of the organic compounds (II) through (IV) are incorporated into the recording layer together with one of the compounds (I), a preferred weight ratio of compounds(I)/compounds (II) through (IV) is obtained and ranges from 10/100 to 90/100, and more preferably from 20/100 to 40/100. These ranges include all specific values and subranges therebetween.

Preferably, the recording layer has a thickness of 0.05–5 microns, and more preferably of 0.1–0.5 microns. These ranges include all specific values and subranges therebetween.

Figure 1B:
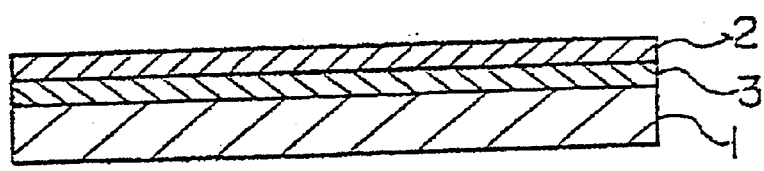
Figure 1C:
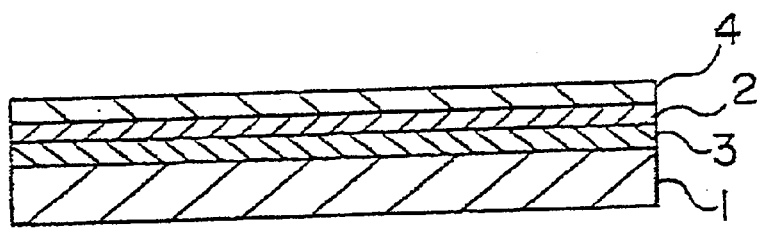
Figure 1D:
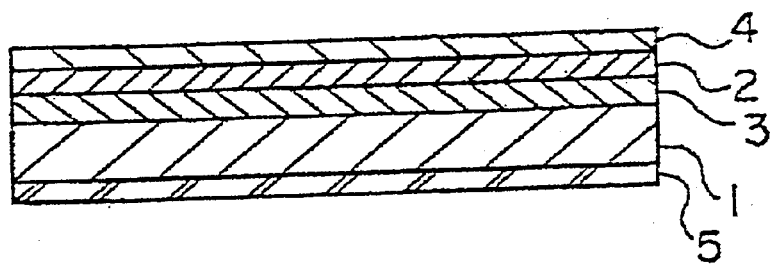

FIGS. 1a through 1d are sectional views of an optical recording medium according to one embodiment of the present invention, which illustrate a structure suitable for a WORM recording medium. In FIG. 1a, a recording medium includes a supporting substrate 1 and a recording layer 2 which is overlaid on the supporting substrate 1. The recording medium may further include an undercoat layer 3 provided between the supporting substrate 1 and the recording layer 2 (as seen in FIG. 1b), a protective layer 4 on the recording layer 2 (FIG. 1c), and/or a hard coat layer 5 under the supporting substrate 1 (FIG. 1d).

Figure 2A:
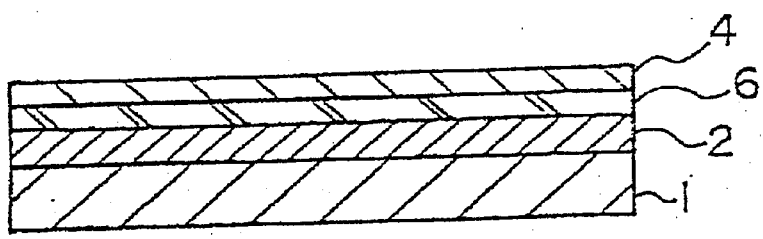
FIGS. 2a through 2c are cross sections of an optical recording medium in accordance with a further embodiment of the present invention.
Figure 2B:
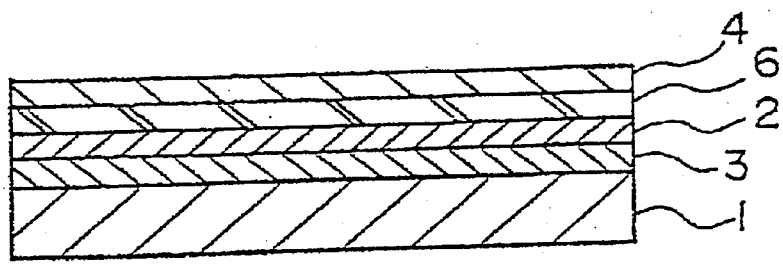
Figure 2C:
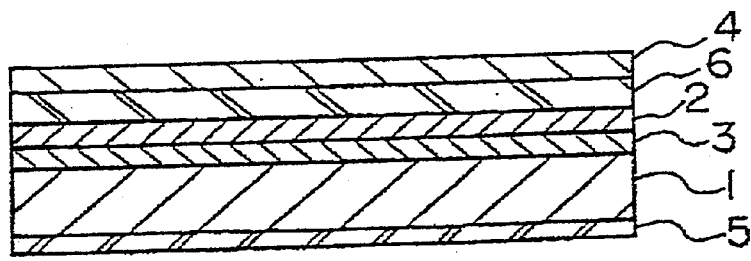

FIGS. 2a through 2c are sectional views of an optical recording medium according to another embodiment of the present invention, which illustrate a structure suitable for a CD-R recording medium. Here, a reflecting layer 6 is further provided, as seen in FIGS. 2a through FIG. 2c.

A recording medium having a structure shown in the above figures may further employ either an air sandwich structure wherein a substrate having a recording layer is sealed with another substrate with a space therebetween while the recording layer remains in the interior or a laminated structure wherein a substrate adheres to another substrate with a protective layer therebetween.

The preferred characteristics of the materials and layers constituting the recording medium of the present invention are described below:

Substrate

Preferably, the supporting substrate is transparent to the laser beam when recording and readout are carried out from the supporting substrate side of the recording medium. However, when the laser beam is incident from the recording layer side, the substrate may be transparent or opaque.

Preferred materials substrate include a sheet or disk made from a polymer such as polyesters, acrylic resin, polyamides, polycarbonate resin, polyolefin resin, phenol resin, epoxy resin, and polyimides; or from another material such as glass, ceramics, and metals.

In addition, guiding grooves or guiding pits for tracking, and/or preformats for addressing signals may be formed on the surface of the supporting substrate.

Recording layer

A recording layer undergoes a change of state when exposed to radiation of high energy density, for example laser light. When such a change of state is associated with a change in optical properties, for example, in the light absorption of the material, this change can be utilized for optical recording of information data.

Preferably, the recording layer of the present invention may includes a combination of a plurality of compounds represented by formula (I). These compounds or pigments are preferably mixed or laminated with other organic pigments, metals, or metallic compounds, to improve the optical characteristics, recording sensitivity, and readout signal characteristics.

Preferred examples of the above-mentioned organic pigments include polymethine dyes, naphthalocyanine compounds, phthalocyanine compounds, squarylium dyes, croconium dyes, pyrilium dyes, naphthoquinone compounds, anthraquinone (indanthrene) compounds, xanthene compounds, triphenylmethane dyes, azulene dyes, tetrahydrocolline compounds, phenanthrene compounds, and triphenothiazine compounds; metallic complex compounds and the like.

Preferred examples of the above-mentioned metals and metallic compounds include In, Te, Bi, Se, Sb, Ge, Sn, Al, Be, $TeO_2$, SnO, As, Cd, and the like. These may be dispersed or laminated into the or onto the recording layer.

Other materials that may be mixed and/or dispersed in the recording layer include polymeric materials such as ionomer resin, polyamides, vinyl resin, natural polymer, silicone, liquid rubber, or silane coupling agents.

In addition, stabilizers such as, for example, transition metal complexes, dispersing agents, flame-retardants, lubricants, antistatic agents, surfactants, plasticizers and the like, may further be added to improve recording characteristics.

Preferred fabrication methods of recording layers include conventional methods such as vacuum evaporation deposition, sputtering methods, the CVD method, or solvent coating methods. For solvent coating, the above-mentioned dyes are dissolved in an organic solvent and subjected to a conventional coating method such as spraying, roller coating, dip coating, or spinner coating.

Preferred examples of organic solvents for solvent coating include alcohols such as methanol, ethanol, and isopropanol; ketones such as acetone, methyl ethyl ketone, and cyclohexanone; amides such as N,N-dimethylacetoamide and N,N-dimethylformamide; sulfoxides such as dimethylsulfoxide; ethers such as tetrahydrofuran, dioxane, diethyl ether, and ethylene glycol monomethyl ether; esters such as methyl acetate and ethyl acetate; halogenated aliphatic hydrocarbons such as chloroform, methylene chloride, dichloroethane, carbon tetrachloride, and trichloroethane; aromatics such as benzene, xylene, monochlorobenzene, and dichlorobenzene; cellosolves such as methoxyethanol and ethoxyethanol; hydrocarbons such as hexane, pentane, cyclohexane, and methylcyclohexane.

The thickness of the recording layer is preferably 0.01–10 microns, and more preferably 0.02–0.2 microns. These ranges include all specific values and subranges therebetween.

Undercoating layer

The undercoating layer is preferably employed (a) to improve adhesive characteristics, (b) as a barrier against water, gases, or the like, (c) to improve the storage stability of recording layers; (d) to improve reflectivity, (e) to protect the substrate from solvents, and (f) for forming guiding grooves, guiding pits, and preformats, and the like.

Preferably, (a) is achieved in the present invention by using various polymeric materials such as ionomer resin, polyamides, vinyl resin, natural polymer, silicone, and liquid rubber, and silane coupling agents. Preferably (b) and (c) are achieved by using, in addition to the above-mentioned polymeric materials, inorganic compounds such as $SiO_2$, $MgF_2$, SiO, $TiO_2$, ZnO, Ti nitride and Si nitride. In addition, metals and semi-metals such as Zn, Cu, Ni, Cr, Ge, Se, Au, Ag, and Al may also be employed.

Preferably, (d) is achieved by using metals such as Al, Au, and Ag; organic thin-films having metallic luster, such as methine dyes and xanthene dyes; (e) and (f) may be achieved using ultraviolet-curing resin, thermosetting resin, and thermoplastic resins.

The under-coating layer preferably has a thickness of 0.01–30 microns, and more preferably a thickness of 0.05–10 microns. These ranges include all specific values and subranges therebetween.

13

Reflecting layer

Preferably, in the reflecting layer of the recording medium, metals, semi-metals and the like, which have a high light reflectivity and are not readily corroded, can be used. Preferred examples of reflective materials include Au, Ag, Al, Cr, Ni, Fe, and Sn; more preferably metals such as Au, Ag, and Al are used. The metals and semi-metals may be used individually or in the form of alloys which contain a plurality of the above-mentioned materials.

Preferably, the reflecting layer is formed by conventional methods such as, for example, vacuum evaporation sputtering. The reflecting layer preferably has a thickness of 0.005–0.5 microns, and more preferably 0.05–0.5 microns. These ranges include all specific values and subranges therebetween.

Protective layer and hard coat layer

Preferably, protective layer and the hard coat layer are optionally provided as the outermost layers of the recording medium. These layers are preferably used to (a) protect the recording layer from damage, dust and contamination, (b) improve the storage stability of the recording layer, and (c) improve reflectivity, and the like.

The materials described above for the under coating layer are preferably used for the protective layer and hard coat layer. In addition, other materials may also be used, which include inorganic materials such as SiO and $SiO_2$; and organic materials such as heat softening or hot melt resin, which include polymethyl acrylates, polycarbonates, epoxy resin, polystyrenes, polyester resin, vinyl resin, cellulose, aliphatic hydrocarbon resin, natural rubber, styrene-butadiene resin, chloroprene rubber, wax, alkyd resin, drying oil, rosin and the like. Among these materials, ultraviolet-curing resin is preferably used.

Preferably, the protective layer and the hard coat layer each has a thickness of 0.01–30 microns, and more preferably 0.05–10 microns. These ranges include all specific values and subranges therebetween.

In the above-mentioned undercoat layer, protective layer and/or hardcoat layer, additional additives such as stabilizing agents, dispersing agents, flame-retardants, lubricants, antistatic agents, surfactants, plasticizers, and the like may further be added in a similar manner to the recording layer in the present invention.

Having generally described this invention, a further understanding can be obtained by reference to certain specific examples which are provided herein for purposes of illustration only and are not intended to be limiting.

EXAMPLES

EXAMPLE 1

A coating composition was prepared by dissolving the compound No. 1 in Table 2 in chloroform. A substrate was prepared by providing, on a polymethyl methacrylate plate of 1.2 mm thick, a spiral guiding groove using a photopolymer with a depth of 0.12 microns, a half-width of 0.4 microns, and a track pitch of 1.4 microns.

14

The coating composition was then spin coated on the substrate to obtain a recording layer having a thickness of about 0.08 microns, whereby a recording medium was prepared.

EXAMPLES 2 through 15

Optical recording media of Examples 2 through 15 were prepared according to the procedure of Example 1, except that each of compound Nos. 2 through 15 in Table 2 was individually substituted for compound No. 1.

COMPARATIVE EXAMPLE 1

A recording medium of Comparative example 1 was prepared according to the procedure of Example 1, except that a compound represented by the formula (V) was substituted for compound No. 1 in Example 1.

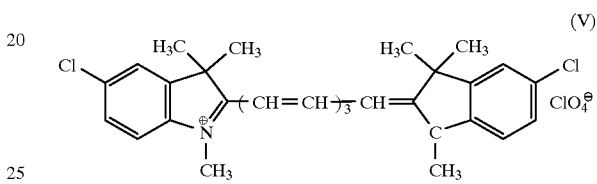

The optical recording media prepared above in Examples 1 through 15 and Comparative example 1 were subjected to evaluation tests for recording and reading information data under the following conditions. For each of the recording media, the recording was carried out with laser light incident upon the supporting substrate side of the recording media, and the readout was subsequently performed for locations recorded as above with readout laser light to obtain C/N ratios and reflectivities.

| Recording conditions: | |
|---|---|
| Laser wavelength | 680 nanometers |
| Recording frequency | 1.25 MHZ |
| Recording line velocity | 1.2 m/sec |
| Readout conditions: | |
| Laser wavelength | |
| 680 nanometers: | Examples 1 to 10 and Comparative Example 1 |
| 635 nanometers: | Examples 11 to 15 |
| Laser power | 0.25 ~ 0.3 mW (continuous) |
| Scanning bandwidth | 30 KHz |

Weather resistance test conditions:

Fading test under continuous Xenon light irradiation at 40 k lux for 720 hours.

Storage test at 85° C., 85% humidity for 720 hours.

The results of the evaluation tests are shown in Table 3.

TABLE 3

| | At the initial stage | | After fading test | | After storage test | |
|---|---|---|---|---|---|---|
| | Reflectivity (%) | C/N ratio (dB) | Reflectivity (%) | C/N ratio (dB) | Reflectivity (%) | C/N ratio (dB) |
| Ex. 1 | 26 | 51 | 21 | 44 | 24 | 45 |
| Ex. 2 | 28 | 52 | 23 | 47 | 25 | 48 |
| Ex. 3 | 26 | 52 | 22 | 46 | 25 | 48 |

TABLE 3-continued

|  | At the initial stage | | After fading test | | After storage test | |
| --- | --- | --- | --- | --- | --- | --- |
|  | Reflectivity (%) | C/N ratio (dB) | Reflectivity (%) | C/N ratio (dB) | Reflectivity (%) | C/N ratio (dB) |
| Ex. 4 | 25 | 50 | 22 | 44 | 23 | 47 |
| Ex. 5 | 26 | 51 | 22 | 45 | 24 | 46 |
| Ex. 6 | 27 | 52 | 24 | 46 | 26 | 48 |
| Ex. 7 | 26 | 52 | 22 | 45 | 23 | 48 |
| Ex. 8 | 26 | 53 | 23 | 46 | 26 | 50 |
| Ex. 9 | 23 | 54 | 22 | 53 | 22 | 54 |
| Ex. 10 | 25 | 54 | 23 | 51 | 24 | 54 |
| Ex. 11 | 24 | 55 | 21 | 53 | 23 | 54 |
| Ex. 12 | 24 | 49 | 20 | 48 | 23 | 48 |
| Ex. 13 | 25 | 51 | 21 | 49 | 25 | 50 |
| Ex. 14 | 27 | 54 | 24 | 51 | 26 | 54 |
| Ex. 15 | 27 | 52 | 24 | 49 | 26 | 51 |
| Comparative Ex. 1 | 11 | non-measurable | 7 | non-measurable | 9 | non-measurable |

EXAMPLE 16

A coating composition was prepared by dissolving the compound No. 16 in Table 2 in a mixture of methylcyclohexane, 2-methoxy ethanol, methyl ethyl ketone, and tetrahydrofuran. A substrate was prepared by providing, on an injection molded polycarbonate substrate of 1.2 mm thick, a spiral guiding groove with a depth of 0.1 microns, a half-width of 0.4 microns, and a track pitch of 1.6 microns.

The coating composition was then spin coated on the substrate to obtain a recording layer having a thickness of about 0.18 microns. On the recording layer, a gold reflecting layer 0.02 microns thick gold was deposited by the sputtering method, followed by the deposition of an acrylic photopolymer protective layer 5 microns thick, whereby a recording medium was prepared.

EXAMPLES 17 through 30

Optical recording media of Examples 2 through 15 were prepared according to the procedure of Example 16, except that each of compound Nos. 17 through 30 in Table 2 was individually substituted for compound No. 16.

COMPARATIVE EXAMPLE 2

A recording medium of Comparative example 2 was prepared according to the procedure of Example 16, except that a compound represented by the formula (V), which was used in Comparative example 1, was substituted for compound No. 16.

The optical recording media prepared above in Examples 16 through 30 and Comparative example 2 were each subjected to evaluation tests, in that (a) EFM (Eight to Fourteen Modulation) signals were recorded on each of the media while tracking at a linear velocity of 1.4 m/sec, using a continuous semiconductor laser emission which had a wavelength of 635 nanometers and a beam diameter of 1.4 micron, and (b) the recorded signals were then read out using the same laser emission (635 nanometers) to obtain readout signal wave forms.

The results of the evaluation tests are shown in Table 4.

TABLE 4

|  | At the initial stage | | After fading test | |
| --- | --- | --- | --- | --- |
|  | Reflectivity (%) | Readout signal waveform | Reflectivity (%) | Readout signal waveform |
| Ex. 16 | 73 | clearly recovered | 72 | clearly recovered |
| Ex. 17 | 75 | clearly recovered | 73 | clearly recovered |
| Ex. 18 | 72 | clearly recovered | 71 | clearly recovered |
| Ex. 19 | 74 | clearly recovered | 72 | clearly recovered |
| Ex. 20 | 73 | clearly recovered | 70 | clearly recovered |
| Ex. 21 | 75 | clearly recovered | 74 | clearly recovered |
| Ex. 22 | 72 | clearly recovered | 71 | clearly recovered |
| Ex. 23 | 74 | clearly recovered | 73 | clearly recovered |
| Ex. 24 | 71 | clearly recovered | 70 | clearly recovered |
| Ex. 25 | 74 | clearly recovered | 73 | clearly recovered |
| Ex. 26 | 72 | clearly recovered | 72 | clearly recovered |
| Ex. 27 | 70 | clearly recovered | 70 | clearly recovered |
| Ex. 28 | 75 | clearly recovered | 73 | clearly recovered |
| Ex. 29 | 72 | clearly recovered | 71 | clearly recovered |
| Ex. 30 | 73 | clearly recovered | 73 | clearly recovered |
| Comp. Ex. 2 | 5 | non-measurable | 5 | non-measurable |

EXAMPLE 31

A coating composition was prepared by dissolving the compound having the formula (VI) and the compound No. 31 in Table 2, at a ratio of 1:1 by weight, in a mixture of methylcyclohexane, 2-methoxy ethanol, methyl ethyl ketone, and tetrahydrofuran. A substrate was prepared by providing, on an injection molded polycarbonate disk of 1.2 mm thickness, a spiral guiding groove with a depth of 0.1 microns, a half-width of 0.45 microns, and a track pitch of 1.6 microns.

$$(VI)$$

[Structure: bis-indole cyanine dye with $CH_3$ groups, $C_4H_9$ N-substituents, connected by $-(CH=CH)_2-CH=$ bridge, with $(ClO_4)^{\ominus}$ counterion]

The coating composition was then spin coated on the substrate to obtain a recording layer having a thickness of about 0.17 microns. On the recording layer, a gold reflecting layer 0.02 microns thick was deposited by the sputtering method, followed by the deposition of an acrylic photopolymer protective layer 5 microns thick, whereby a recording medium was prepared.

EXAMPLES 32 through 37

Optical recording media of Examples 32 through 37 were prepared according to the procedure of Example 31, except that each of compound Nos. 32 through 37 in Table 2 was individually substituted for compound No. 31.

EXAMPLES 38 through 44

Optical recording media of Examples 38 through 44 were prepared according to the procedure of Example 31, except that each of compound Nos. 38 through 44 in Table 2 was individually used, and that a compound of the formula (VII) was also used in place of compound (VI) used in Example 31.

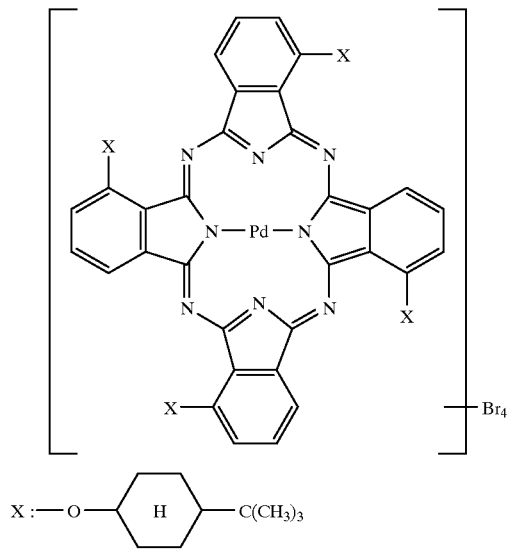

(VII)

EXAMPLES 45 through 50

Optical recording media of Examples 45 through 50 were prepared according to the procedure of Example 31, except that each of compound Nos. 45 through 50 in Table 2 was individually used, and that a compound of the formula (VIII) was also used in place of compound (VI) used in Example 31.

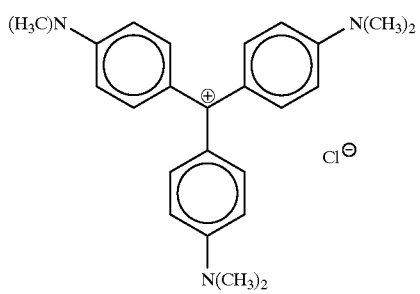

(VIII)

COMPARATIVE EXAMPLES 3 through 5

Recording media of Comparative examples 3 through 5 were prepared according to the procedure of Example 31, except that each of compounds of the formulas (VI), (VII), and (VIII) was individually employed.

The optical recording media prepared above in Examples 31 through 50 and Comparative examples 3 through 5 were each subjected to evaluation tests, in that (a) EFM signals were recorded on each of the media while tracking at a linear velocity of 1.4 m/sec, using a continuous semiconductor laser beam having a wavelength of 780 nanometers and a beam diameter of 1.4 microns, and (b) the recorded signals were then readout using the same laser beam as above (780 nanometers) and also using a 635 nanometers laser beam with a beam diameter of 1.4 micron, to obtain readout signal wave forms.

The results of the evaluation tests are shown in Table 5.

TABLE 5

| | Laser wavelength 780 nanometers | | Laser wavelength 680 nanometers | |
|---|---|---|---|---|
| | Reflectivity (%) | Readout signal waveform | Reflectivity (%) | Readout signal waveform |
| Ex. 31 | 71 | clearly recovered | 22 | clearly recovered |
| Ex. 32 | 73 | clearly recovered | 23 | clearly recovered |
| Ex. 33 | 74 | clearly recovered | 22 | clearly recovered |
| Ex. 34 | 72 | clearly recovered | 24 | clearly recovered |
| Ex. 35 | 72 | clearly recovered | 23 | clearly recovered |
| Ex. 36 | 75 | clearly recovered | 22 | clearly recovered |
| Ex. 37 | 74 | clearly recovered | 24 | clearly recovered |
| Ex. 38 | 70 | clearly recovered | 21 | clearly recovered |
| Ex. 39 | 72 | clearly recovered | 20 | clearly recovered |
| Ex. 40 | 74 | clearly recovered | 23 | clearly recovered |
| Ex. 41 | 71 | clearly recovered | 22 | clearly recovered |
| Ex. 42 | 73 | clearly recovered | 24 | clearly recovered |
| Ex. 43 | 72 | clearly recovered | 23 | clearly recovered |
| Ex. 44 | 73 | clearly recovered | 20 | clearly recovered |
| Ex. 45 | 73 | clearly recovered | 20 | clearly recovered |
| Ex. 46 | 70 | clearly recovered | 21 | clearly recovered |
| Ex. 47 | 71 | clearly recovered | 23 | clearly recovered |
| Ex. 48 | 72 | clearly recovered | 24 | clearly recovered |
| Ex. 49 | 71 | clearly recovered | 22 | clearly recovered |
| Ex. 50 | 73 | clearly recovered | 23 | clearly recovered |
| Comp. Ex. 4 | 75 | clearly recovered | 5 | non-measurable |
| Comp. Ex. 5 | 74 | clearly recovered | 5 | non-measurable |
| Comp. Ex. 6 | 74 | clearly recovered | 5 | non-measurable |

The results obtained in the above examples indicate that the recording materials of the present invention can be employed as a high density recording media at shorter laser wavelengths, which have excellent light resistance and storage stability. The recording materials of the present invention are effective for recording and readout by the present CD-R systems, and also for readout by high-density optical disk systems of the next generation. It is noteworthy that the recording density in the latter is expected from about 1.6 to 1.8 times of that in the former, which is useful for future optical information recording.

This application is based on Japanese Patent Application 08-181603, filed with the Japanese Patent Office on Jun. 21, 1996, the entire contents of which are hereby incorporated by reference.

Obviously, additional modifications and variations of the present invention are possible in light of the above teaching. It is therefore to be understood that within the scope of the appended claims, the invention may be practiced otherwise than as specifically described herein.

What is claimed as new and is desired to be secured by letters patent of the United States is:

1. An optical information recording medium, comprising:

a supporting substrate; and a recording layer coated on said substrate; wherein said recording layer comprises a metal chelated azo compound, the azo compound having the general formula (I):

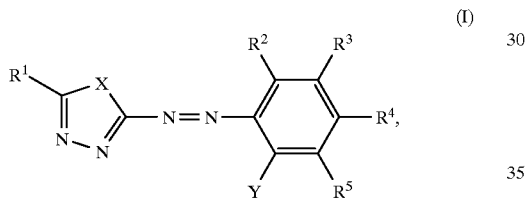

wherein X is $NR^6$ group, oxygen or sulphur, wherein $R^6$ is hydrogen or alkyl;

Y is hydroxy, carboxy, or carbamoyl;

each of $R^1$–$R^5$ is independently hydrogen, substituted or unsubstituted alkyl, substituted or unsubstituted aryl, substituted or unsubstituted alkenyl, alkoxy, amino, halogen, nitro, cyano, trifluoromethyl, or carboxy, with the proviso that all of $R^1$–$R^5$ are not simultaneously hydrogen;

and the metal is a metal ion of Groups 3–12 of the Periodic Table.

2. The optical information recording medium of claim 1, wherein $R^2$ and $R^4$ is each independently an electron donating group.

3. The optical information recording medium of claim 2, wherein said electron donating group is an alkyl, amino, or alkoxy group.

4. The optical information recording medium of claim 1, wherein $R^4$ is an amino group of the formula $NR^7R^8$, wherein $R^7$ and $R^8$ is each independently hydrogen, alkyl, or aryl.

5. The optical information recording medium of claim 1, wherein said recording layer further comprises an organic compound having a light absorption maximum between 680 and 750 nanometers.

6. The optical information recording medium of claim 5, wherein said organic compound is selected from the group consisting of cyanine dyes, phthalocyanine dyes, diarylmethane dyes, and triarylmethane dyes.

7. The optical information recording medium of claim 5, wherein said metal chelated azo compound and said organic compound are in a weight ratio of 10:100–90:100.

8. The optical information recording medium of claim 1, further comprising an undercoat layer between said supporting substrate and said recording layer.

9. The optical information recording medium of claim 1, further comprising a light reflecting layer coated on said recording layer.

10. The optical information recording medium of claim 1, further comprising a protective layer coated on an outermost surface of said recording medium.

11. A method of recording optical information, comprising:

irradiating with radiation having a wavelength between 630–720 nanometers, an optical information recording medium, which comprises:

a supporting substrate; and a recording layer coated on said substrate; wherein said recording layer comprises a metal chelated azo compound, the azo compound having the general formula (I):

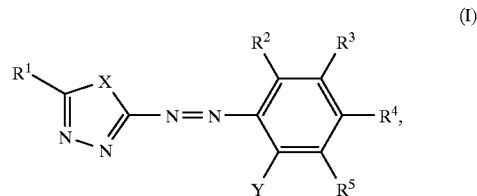

wherein X is $NR^6$ group, oxygen or sulphur, wherein $R^6$ is hydrogen or alkyl;

Y is hydroxy, carboxy, or carbamoyl;

each of $R^1$–$R^5$ is independently hydrogen, substituted or unsubstituted alkyl, substituted or unsubstituted aryl, substituted or unsubstituted alkenyl, alkoxy, amino, halogen, nitro, cyano, trifluoromethyl, or carboxy, with the proviso that all of $R^1$–$R^5$ are not simultaneously hydrogen;

and the metal is a metal ion of Groups 3–12 of the Periodic Table.

12. The method of claim 11, wherein $R^2$ and $R^4$ is each independently an electron donating group.

13. The method of claim 12, wherein said electron donating group is an alkyl, amino, or alkoxy group.

14. The method of claim 11, wherein $R^4$ is an amino group of the formula $NR^7R^8$, wherein $R^7$ and $R^8$ is each independently hydrogen, alkyl, or aryl.

15. A method of recording optical information, comprising:

irradiating with radiation having a wavelength between 600–780 nanometers, an optical information recording medium, which comprises:

a supporting substrate;

a recording layer coated on said substrate; wherein said recording layer comprises a metal chelated azo compound, the azo compound having the general formula (I):

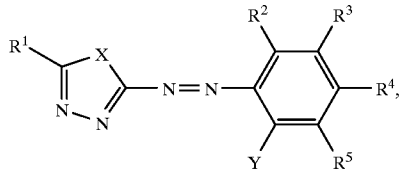

wherein X is $NR^6$ group, oxygen or sulphur, wherein $R^6$ is hydrogen or alkyl;

Y is hydroxy, carboxy, or carbamoyl;

each of $R^1$–$R^5$ is independently hydrogen, substituted or unsubstituted alkyl, substituted or unsubstituted aryl, substituted or unsubstituted alkenyl, alkoxy, amino, halogen, nitro, cyano, trifluoromethyl, or carboxy, with the proviso that all of $R^1$–$R^5$ are not simultaneously hydrogen;

and the metal is a metal ion of Groups 3–12 of the Periodic Table; and an organic compound having a light absorption maximum at 680–750 nanometers.

16. The method of claim 15, wherein said recording layer further comprises an organic compound having a light absorption maximum between 680 and 750 nanometers.

17. The method of claim 16, wherein said organic compound is selected from the group consisting of cyanine dyes, phthalocyanine dyes, diarylmethane dyes, and triarylmethane dyes.

18. The method of claim 16, wherein said metal chelated azo compound and said organic compound are in a weight ratio of 10:100–90:100.

* * * * *

UNITED STATES PATENT AND TRADEMARK OFFICE
CERTIFICATE OF CORRECTION

PATENT NO. : 5,939,163
DATED : August 17, 1999
INVENTOR(S) : Yasunobu UENO, et al.

It is certified that error appears in the above-identified patent and that said Letters Patent is hereby corrected as shown below:

On the title page, item [75], the 5th inventor's name should be:

--Yasuhiro Higashi--

Signed and Sealed this

Twenty-third Day of May, 2000

Attest:

Q. TODD DICKINSON

*Attesting Officer*  *Director of Patents and Trademarks*